(12) United States Patent
Casa

(10) Patent No.: US 10,337,114 B2
(45) Date of Patent: Jul. 2, 2019

(54) PROCESS FOR THE TREATMENT OF END-OF-LIFE CATHODE-RAY TUBES

(71) Applicant: E.V.H. S.r.l., Milan (IT)

(72) Inventor: Francesco Della Casa, Verona (IT)

(73) Assignee: E.V.H. S.r.l., Milan (IT)

( * ) Notice: Subject to any disclaimer, the term of this patent is extended or adjusted under 35 U.S.C. 154(b) by 128 days.

(21) Appl. No.: 15/465,935

(22) Filed: Mar. 22, 2017

(65) Prior Publication Data

US 2017/0275772 A1 Sep. 28, 2017

(30) Foreign Application Priority Data

Mar. 24, 2016 (IT) .................. 102016000031082

(51) Int. Cl.
  *C25C 1/18* (2006.01)
  *C01B 33/12* (2006.01)
  *C22B 3/00* (2006.01)
  *C25C 7/08* (2006.01)
  *C22B 7/00* (2006.01)

(52) U.S. Cl.
  CPC .............. *C25C 1/18* (2013.01); *C01B 33/128* (2013.01); *C22B 7/008* (2013.01); *C22B 13/045* (2013.01); *C25C 7/08* (2013.01); *Y02P 10/234* (2015.11)

(58) Field of Classification Search
  CPC ................................................... C22B 13/045
  USPC ........................................................ 75/725
  See application file for complete search history.

(56) References Cited

U.S. PATENT DOCUMENTS

| 4,304,646 A * | 12/1981 | Courduvelis ............. C25C 1/12 205/772 |
| 2014/0154157 A1 | 6/2014 | Modica |
| 2017/0275734 A1 * | 9/2017 | Modica ................. C22B 13/045 |

FOREIGN PATENT DOCUMENTS

| CN | 104532002 A * | 4/2015 |
| DE | 3719583 A1 | 12/1988 |
| EP | 2455500 A1 | 5/2012 |

OTHER PUBLICATIONS

Patnaik, Pradyot. (2010). Handbook of Environmental Analysis—Chemical Pollutants in Air, Water, Soil, and Solid Wastes (2nd Edition)—8. Analysis of Metals by Atomic Absorption and Emission Spectroscopy. Taylor & Francis. (Year: 2010).*
Perlmutter, Barry A.. (2015). Solid-Liquid Filtration—Practical Guides in Chemical Engineering—3.2.8 Belt Press. Elsevier. (Year: 2015).*
PCT International Search Report for corresponding PCT Application No. PCT/EP2017/056854, dated May 26, 2017, pp. 1-11.
Yot et al., "Lead Extraction From Waste Funnel Cathode-Ray Tubes Glasses by Reaction With Silicon Carbide and Titanium Nitride", Journal of Hazardous Materials, 172 (2009) pp. 117-123.
Sasai et al., "Development of an Eco-Friendly Material Recycling Process for Spent Lead Glass Using a Mechanochemical Process and Na2EDTA Reagent", Environmental Science Technology, 42 (2008) pp. 4159-4164.
Miyoshi et al., "A Novel Process Utilizing Subcritical Water to Remove Lead from Wasted Lead Silicate Glass", Chemistry Letters, 33 (2004) pp. 956-957.

* cited by examiner

*Primary Examiner* — Colleen P Dunn
*Assistant Examiner* — Jeremy C Jones
(74) *Attorney, Agent, or Firm* — Pepper Hamilton LLP

(57) ABSTRACT

A process for recycling glass from screens deriving from the disposal of cathode-ray tube television sets with quantitative recovery of the lead in metal form, is described.

13 Claims, 1 Drawing Sheet

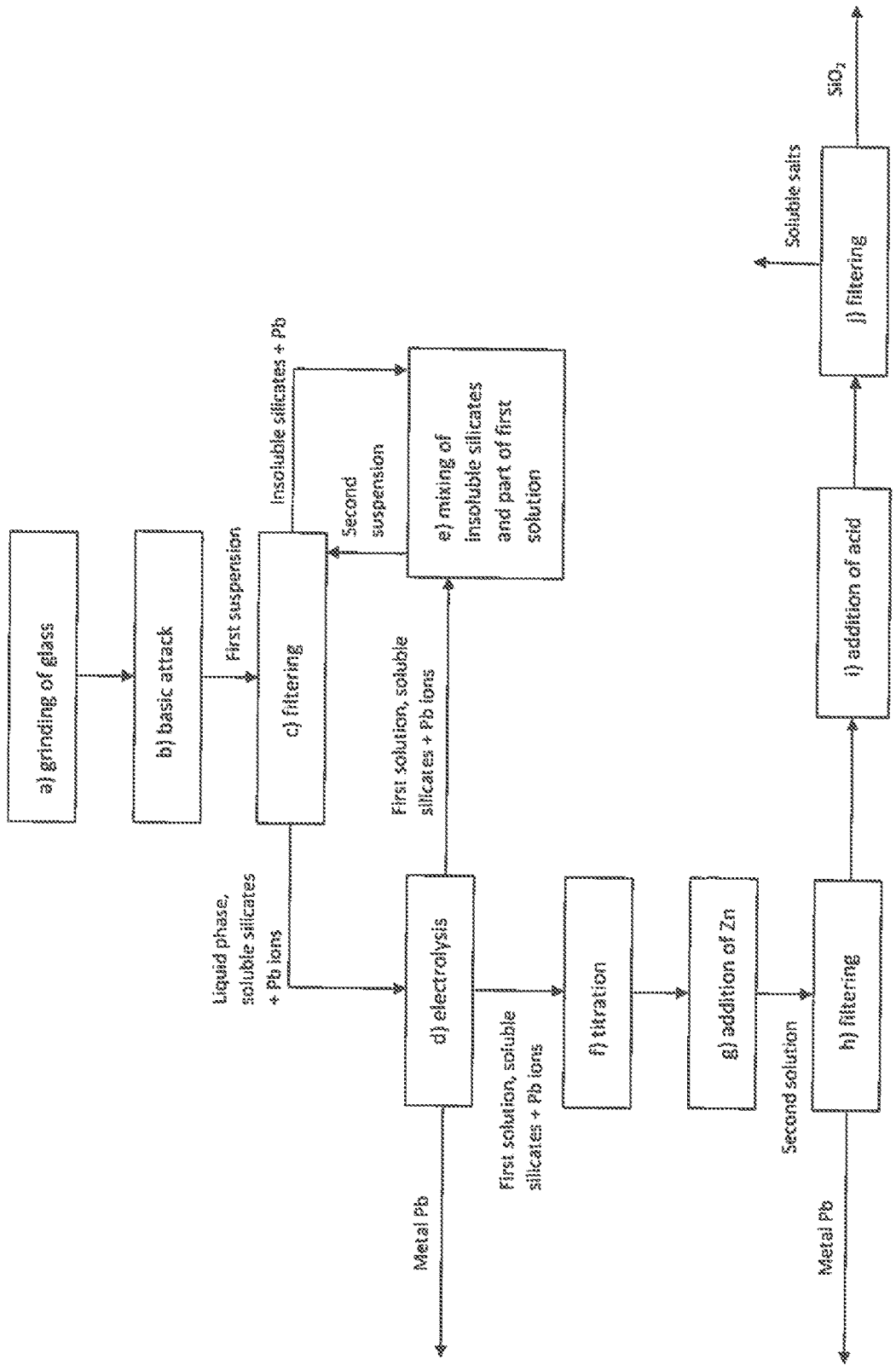

PROCESS FOR THE TREATMENT OF END-OF-LIFE CATHODE-RAY TUBES

This application claims the benefit of Italian Patent Application Serial No. 102016000031082, filed Mar. 24, 2016, which is hereby incorporated by reference in its entirety.

TECHNICAL FIELD

The present invention relates to a process for the recovery of lead contained in the glass of funnels which derive from the disposal of cathode-ray tube television sets and to the conversion of the remaining glass of the screens into soluble silicates.

BACKGROUND

The European Directives on Waste Electrical and Electronic Equipment (WEEE) were implemented in Italy by Legislative Decree 151 of 25 Nov. 2005.

In the specific case of cathode-ray tube television sets, classified as R3, over 75,000 tons of waste material were recovered in the year 2012 by consortiums and specialized companies. The treatments performed on old television sets consist in dismantling them and separating the various types of component materials; the recycling methods are consolidated and efficient for plastic materials, wood-based materials, electronic boards, electrical cables, windings and other metallic materials, while the recycling of the glass parts which constitute the walls of the cathode-ray tube (CRT) is more complex.

A cathode-ray tube consists of the union of two parts: the front part (screen) made of barium/strontium glass and the rear part (named "funnel") made of lead glass. Previously, these parts were separated, ground and sent to the manufacturing of new similar parts; with the phase-out of the production of cathode-ray tube television sets, it has become necessary to devise disposal treatments of these parts which do not cause environmental problems.

The glass of the screen is currently ground and recycled, for example in the ceramic or glass industries.

Instead, the glass of the funnel is generally coarsely ground, subjected to tumbling to remove the coatings made of harmful toxic materials from the inner walls, and the glass thus treated is then generally sent to the landfill and only rarely recycled as secondary raw material.

In addition to being very costly and representing a possible source of soil pollution in all cases, disposal in authorized landfills constitutes a considerable waste of potentially reusable materials; considering that the funnel weighs about 5 kg in a medium-size CRT and that the minimum lead content in the funnel glass is 17% by weight, from this waste material at least 0.85 kg of lead can be hypothetically recovered per cathode-ray tube. In large-size television sets, the weight of the lead glass can reach even 10 kg, doubling the potential recovery values indicated above.

Some possible methods for the recovery of lead from the funnel of CRTs are described in technical-scientific literature.

For example, the article "A novel process utilizing subcritical water to remove lead from wasted lead silicate glass", of H. Miyoshi et al., Chemistry Letters, vol. 33 (2004), no. 8, pages 956-957, describes a lead glass attack made using water only at a temperature of 355° C. and a pressure of approximately 240 bar, followed by acid leaching at 100° C. to convert the silicate of the glass into silica and recover a soluble lead salt.

The article "Development of an eco-friendly material recycling process for spent lead glass using a mechanochemical process and Na2EDTA reagent", R. Sasai et al., Environmental Science Technology, vol. 42, (2008) no. 11, pages 4159-4164, describes a micronization procedure of glass with zirconium oxide balls in presence of a solution of Na2EDTA, with which up to 99% of the lead initially contained in the glass can be extracted.

Finally, the article "Lead extraction from waste funnel cathode-ray tubes glasses by reaction with silicon carbide and titanium nitride", P. G. Yot et al., Journal of Hazardous Materials, vol. 172 (2009), no. 1, pages 117-123, shows a study on the reduction of Pb(II) to metal lead in the glass; this reduction however is said to occur only partially.

However, the processes described in these articles represent only basic studies and for various reasons are not useful in real practice for the purposes of an industrial disposal process of lead glass to be implemented on large quantities of material.

In the United Kingdom, Nulife Glass Ltd. recovers metal lead from the glass of CRTs using a pyrometallurgical process, claiming a recovery of 95% of the lead present in the glass. However, this process is burdensome from the environmental and energy points of view because it implements the recovery of metallic lead by heating the mass to a temperature higher than 1000° C. and adding carbon as reducing agent; this process inevitably releases lead vapors, which must be abated to prevent environmental contamination. Furthermore, the process residue still contains about 5% of the initial lead, which is still an amount requiring to be disposed of as hazardous waste.

Patent application EP 2455500 A1, assigned to Costech International S.p.A., describes a fully hydrothermal process for the treatment of lead glass, which consists in an alkaline attack of the glass obtaining a suspension containing soluble silicates and insoluble parts, silicate-based in their turn; and subsequent precipitation of the lead from the liquid fraction of this suspension in form of sulfide, PbS, by adding hydrogen sulfide (H2S) or an alkaline sulfide (preferably sodium sulfide, Na2S) to the same. Although effective, this process still display some disadvantages, related in particular to the use of toxic or dangerous materials (such as H2S), and in that the PbS which is recovered must then be treated, in order to obtain metallic lead, using traditional pyrometallurgical processes, which require high temperatures and lead to the formation of sulfur dioxide, SO2, which is a highly polluting substance and which requires suitable recovery/abatement procedures. Another limit of this process is that part of the initial lead, entrapped in the solid fraction of insoluble silicates, is not recovered and remains in the glass.

It is thus still present in the sector the need to avail of a process for the recovery of lead from glass containing it, which is suitable to be adopted on industrial scale and which gives rise to a nearly quantitative recovery of the metal, leaving at most in the silicate byproducts of the process quantities of the metal which are negligible and not harmful.

SUMMARY

It is the object of the present invention to provide a process which allows an essentially complete recovery of lead from glasses containing it, in addition to the recovery of soluble silicates present in the original glass.

These objects are achieved by means of the present invention with a process which comprises the following steps: a) grinding the glass to obtain a powder of grain size between 1 mm and 200 μm; b) attacking the glass with a strongly alkaline solution at a temperature of at least 180° C., obtaining a first suspension consisting of a water-based liquid phase containing soluble silicates and lead in the form of Pb2+ ion, and a particulate of insoluble silicates; c) filtering the suspension to separate the liquid phase from the particulate; d) treating said liquid phase in an electrochemical cell with deposit of metallic lead onto the cathode and extracting from the cell a first solution containing soluble silicates and between 0.07 and 0.12% by weight of Pb2+ ion; e) uniting a first part of said first solution with the insoluble silicates particulate separated in step c) and recirculating the obtained mixture in step c); f) titrating the second part of said first solution to determine the concentration of Pb2+ ion; g) treating said second part of the first solution with metallic zinc for the reduction of Pb2+ to metallic lead, obtaining a second solution containing less than 50 ppm of Pb2+ ion; h) filtering to extract the metallic lead from said second solution.

The process of the invention further preferably comprises a further step, i), of adding an acid to the second silicate solution containing less than 50 ppm of Pb2+ ion, with subsequent separation of silica and salts of the metals of said silicates.

BRIEF DESCRIPTION OF THE DRAWINGS

FIG. 1 is a flowchart of an exemplary process for recycling glass from screens deriving from the disposal of cathode-ray tube television sets with quantitative recovery of the lead in metal form of the present technology.

DETAILED DESCRIPTION

The invention will be described with reference to the sole FIGURE, which shows a flow chart, which diagrammatically illustrates the process of the invention.

The first step of the process of the invention, a), consists in grinding the lead glass. The object of the grinding it to accelerate the subsequent passage of chemical attacking of the glass itself, to make the whole process advantageous on industrial level; indeed, since the subsequent chemical attack is a solid-liquid reaction, it is appropriate to increase the exposed glass surface for the reaction to occur in acceptable times. The inventors have verified that, for the purposes of the invention, the glass must be ground to obtain particles of size smaller than 1 mm, and preferably smaller than 0.9 mm; particles of this size may be easily selected, after grinding, by screening with mechanical sieves. If it is desired to accelerate further the dissolution speed of the subsequent chemical attack of the glass and obtain insoluble products in micronized form, the grinding may be pushed with ball mills to obtain powder with grain size of approximately 200 μm; beyond this level of fineness, the grinding time is extended unnecessarily without a corresponding advantage in the chemical attack time.

The second step, b), consists in the chemical attack of the glass by a strongly alkaline solution at a temperature between 180 and 240° C. This solution is preferably an aqueous solution of a hydroxide of an alkali metal, preferred sodium hydroxide (NaOH) or potassium hydroxide (KOH), in a concentration of between 30 and 50% by weight. If the industrial system network water is particularly hard, it is preferable to use demineralized water to further reduce the possible formation of insoluble metal silicates or of insoluble salts of present anions.

An overpressure is not applied from the outside during this step, but given the concerned temperatures the reaction must be made to occur in autoclave for the establishment of the autogenous pressure due to evaporation of part of the water. The glass consists in a mixture of silicates of alkali metals and of other metals (among which mainly alkaline-earth metals); the alkali metal silicates are soluble in the chemical attack conditions described above, while the other metal silicates are poorly soluble or insoluble. A first suspension is thus formed in this step, consisting of a water-based liquid phase containing soluble silicates and lead in form of Pb2+ ion and an insoluble silicate particulate. If NaOH solutions are used, the ratio by weight between the base (considering the pure base and not the aqueous solution) and the glass is preferably between 2.8 and 3.5, and even more preferably between 3.2 and 3.4.

Step c) consists in filtering the first suspension obtained in the previous step; in order to accelerate the filtering times, a filter press is preferably used for this passage. As a result of this operation, the first suspension is separated in a liquid phase, which contains the soluble silicates and part of the lead initially present in the glass in form of Pb2+ ion, and a (wet) particulate constituted by the fraction of insoluble silicates of the initial glass and a part of lead bound in the inorganic macromolecles of these silicates.

The insoluble silicates output from the filter have a residual humidity between 45 and 55% by weight, being impregnated with the solution of soluble silicates. The lead in such material is due, in the given chemical-physical conditions, in part to that contained in the soluble silicates and in part to the insoluble fraction. The lead associated with the soluble fraction is extracted by washing with soluble silicate with low lead content and/or by washing with aqueous solutions of strong bases with 0.5-10% concentration.

In step d), the liquid phase obtained as described above is treated in an electrochemical cell to implement the deposit on the cathode in form of metallic lead of the lead present in solution.

The electrolytic cell must be made of plastic supported by a metal structure, typically made of steel, because the liquid phase to be treated has a high density and thus a heavy weight in case of the treatment of cubic meters of liquid, which is the quantity needed for an actual industrial usefulness of the process.

The electrolytic cell contains a series of electrodes (e.g. 24), in form of parallel plates, which in operation are brought, in alternating order, to cathodic and anodic potential, so that each cathode is interposed between two anodes and vice versa (obviously besides the two outermost electrodes of the series). Suitable materials for making the electrodes are stainless steels, in particular AISI 304 and 316 steel.

The cells forming the electrochemical cell battery may be connected in series to obtain a mean current density on the electrode surfaces between 300 and 700 A/m2. By experimentation, it has however arisen that connecting the cells in parallel is more convenient and effective in terms of electrode efficiency.

The distance between the electrodes may vary between about 5 and 8 cm. The inventors have observed that at smaller distances the risk of short circuit increases, caused by "bridges" formed by the lead that settles on the cathode, also as a consequence of the deformation of the electrodes due to the weight of the lead itself (the deposit of lead on the cathodes is not uniform), as well as of the deformation of the supports of the electrodes and as the temperature varies; vice versa, distances between the electrodes higher than those indicated above cause a decrease in yield of the system. The distance between the electrodes is preferably of about 6 cm.

The electrolysis operating conditions are a potential differential between the electrodes of 1.4 and 2.0 V and a current density between 300 and 500 A/m2, preferably of about 450 A/m2.

During the electrolysis, oxygen is developed at the anode, while metal lead is deposited on the cathode. The inventors have also observed that the deposited lead is at least in part spongy, to the extent that the parts which detach from the cathode (either spontaneously or with the methods described below) float on the liquid phase. The reasons of the phenomenon have not been systematically investigated, but it is possible that the deposition of lead and the discharge of hydrogen occur in competitive manner at the cathode, and that the extent of this parasite reaction increases as the concentration of lead in the liquid phase decreases; the hydrogen released at the cathode could remain physically entrapped in the metal during its depositing, leading to a form of lead having a mean density which is much lower than the theoretical density.

The excessive accumulation of lead on the cathodes is the source of various problems: because of the weight, it may cause the deformation of the steel plates, which in addition to altering the system from the mechanical point of view, has the immediate consequence of varying the geometric parameters of the cell thus altering its operation, up to the possibility of short circuits between the electrodes. It is therefore necessary to remove the lead deposited on the cathodes continuously or at least periodically.

In a first embodiment of the method of the invention, the removal of lead from the cathodes occurs by periodically inverting the polarity of the electrodes. Said operation may be performed after an electrolysis period lasting from 10 to 60 minutes, preferably from 15 to 30 minutes. However, this method is not optimal because it does not entirely eliminate the problem of electrodes deformation.

A second embodiment is thus preferable, in which the cathodes are continuously cleaned from the deposited lead by means of a plastic material cleaning arm, which works with variable frequency according to the concentration of lead in the liquid phase subjected to electrolysis. Various types of mechanical movements, associated with various electrode geometries, can be used for this purpose: movement of a horizontal scraper, operating from the top downwards, or vice versa; horizontal movement from the right leftwards, and vice versa; or a 90° movement on an axis position at a top of the electrode.

However, in each of the two embodiment modes, most of the lead initially contained in the liquid phase is separated in form of metallic lead, which is collected either on the bottom of the electrolysis tank or on the surface of the liquid phase for the part in form of floating lead. The electrolysis is continued until the liquid phase contains between 0.07 and 0.12% by weight of Pb2+ ions. The operation is not protracted beyond this point, because under these concentrations of lead the hydrogen discharge reaction at the cathode becomes predominant and the energy efficiency of the further electrolysis would be very low.

The solution obtained at the end of the electrolysis, hereinafter named first solution, is divided into two parts.

A first part of this solution, in step e) of the process, is reunited with the insoluble silicates wet particulate that was obtained by filtering during step c). Indicatively, between 20 and 40% of the first solution is used for this operation. The insoluble silicate particulate constitutes a matrix that, because of its viscosity and physical form, entraps part of the lead of the initial glass. The inventors have observed that by putting this particulate into contact with a solution poor in lead, as the first solution obtained from the electrolysis, the concentration gradient of lead contributes to extracting the element from the particulate. The suspension thus obtained is sent back to the filtering on the filter press of step c), and from here separated again into a particulate with a lead content lower than the initial one, and a liquid phase sent to electrolysis. The result is the recirculation of the particulate to filtering, with gradual extraction of the lead initially contained in the glass and then its quantitative recovery in the electrolysis operation.

The second part of the first solution is instead preliminarily titrated in step f) to determine the exact value of the residual content of lead, and a measured amount of metal zinc is then added in step g).

The titration may be performed with atomic absorption analysis or with ICP (Inductively Coupled Plasma) emission spectroscopy analysis, with methods well known to a person skilled in the art.

Metal zinc, which reduces the residual Pb2+ ion, is then added to this second part of first solution. The result of this operation is the precipitation of further metallic lead, obtaining a second solution, in which the quantity of Pb2+ ion is lower than 50 ppm.

This second solution is subjected in step h) to a new step of filtering, to remove the metallic lead that has formed. The lead particulate has very fine grain size, therefore filters capable of retaining particles with size greater than 200 μm are used for this operation.

The second solution, after filtering, contains: lead in quantity such to respect the legal limits; Zn2+ ion (in molar quantity equal to the lead that has been reduced), which however is not a dangerous metal; and soluble silicates (e.g. alkaline silicates), which are commonly used raw materials.

With the process as described above, thus, the lead is extracted in practically quantitative mode from the glass which contained it in metal form, and a solution (second solution) is obtained as final product which is no more dangerous and which constitutes a raw material or secondary raw material; the sequence of steps a)-h) thus achieves the minimum necessary result for disposing of lead glass.

However, the process preferably comprises a further step, i), in which an acid is added to the second solution, after the filtering of the step h), to bring the pH to a value lower than about 11. Following this addition, very pure silica precipitates from the solution and metal salts of the soluble silicates are formed; these salts, depending on the acid used and the specific metal ion, may be in their turn either soluble or not.

In a preferred embodiment, the acid used is carbonic acid, added in form of CO2 that is made to bubble in the second solution. In this case, carbonates, in particular of sodium e potassium, which are totally harmless and completely soluble in the solution, are formed in addition to silica; by means of a last operation of filtering (diagrammatically shown in the FIGURE as step j)) it is possible in this case to separate the pure silica, which may be used as raw material in numerous industrial processes, while the resulting solution may be either eliminated or used, for example, in the production of fertilizers (for the part of potassium which is present). The silica thus obtained, after the addition of a sodium silicate solution so as to modify the molar ratio between silica and sodium, can then be used in various industrial applications.

What is claimed is:

1. A process for the recovery of lead and silicates from a lead-containing glass, the process comprising:
grinding the glass to obtain a powder having a grain size between 1 mm and 200 µm;
attacking the glass with a alkaline solution at a temperature of at least 180° C. to obtain a first suspension comprising a water-based liquid phase containing soluble silicates and lead in the form of the ion $Pb^{2+}$, and a particulate of insoluble silicates;
filtrating the first suspension to separate the liquid phase from the particulate;
treating the liquid phase in an electrochemical cell to implement a deposit of metallic lead onto the cathode and extraction from the electrochemical cell of a first solution containing soluble silicates and between 0.07 and 0.12% by weight of Pb' ion;
uniting a first part of the first solution with the insoluble silicates particulate separated during the filtrating step and recirculating the obtained mixture in the filtrating step;
determining the concentration of $Pb^{2+}$ ion in the second part of the first solution;
treating the second part of the first solution with metallic zinc for the reduction of $Pb^{2+}$ to metallic lead to obtain a second solution containing less than 50 ppm of $Pb^{2+}$ ion;
filtering the second solution to extract the metallic lead from the second solution.

2. The process according to claim 1, wherein the attacking the glass with the strongly alkaline solution is carried out at a temperature between 180 and 240° C. with an aqueous solution of a hydroxide of an alkali metal in a concentration of between 30 and 50% by weight.

3. The process according to claim 2 wherein, when the hydroxide employed is sodium hydroxide, the weight ratio between the base and the glass is between 2.8 and 3.5.

4. The process according to claim 1, wherein the filtrating the first suspension is carried out using a filter press.

5. The process according to claim 1, wherein the electrochemical cell is made of a plastic material supported by a metal frame, containing a series of electrodes in the form of parallel plates alternately to cathodic potential and anodic potential and mutually spaced between 5 and 8 cm, and the treating comprises applying to the electrodes a potential difference of between 1.4 and 2.0 V and using a current density of between 300 and 500 $A/m^2$.

6. The process according to claim 5, in which the electrodes of the electrochemical cell are electrically connected in parallel between them.

7. The process according to claim 1, wherein the treating the liquid phase in the electrochemical cell is carried out by peeling off from the cathodes the deposited lead by periodic inversion of the polarity of the electrodes, after electrolysis periods lasting between 10 and 60 minutes.

8. The process according to claim 1, wherein the treating the liquid phase in the electrochemical cell is carried out by peeling off from the cathodes the deposited lead via a plastic cleaning arm.

9. The process according to claim 1, wherein the amount of first solution that in the united step is united to the particulate is between 20 and 40% of the first solution.

10. The process according to claim 1, in which the titrating step is carried out with an atomic absorption analysis or ICP emission spectroscopy analysis.

11. The process according to claim 1 further comprising:
adding an acid to the second solution from which lead was removed in the filtering step, with precipitation of pure silica.

12. The process according to claim 11, wherein the acid is carbon dioxide, $CO_2$.

13. The process according to claim 11, further comprising:
filtrating the solution obtained in the adding step for the recovery of silica.

* * * * *